(12) United States Patent
Kimoto

(10) Patent No.: US 11,886,713 B2
(45) Date of Patent: Jan. 30, 2024

(54) MEMORY CONTROL METHOD, MEMORY CONTROL DEVICE, PROGRAM

(71) Applicant: NEC Corporation, Tokyo (JP)

(72) Inventor: Kei Kimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 87 days.

(21) Appl. No.: 17/625,427

(22) PCT Filed: Jun. 19, 2020

(86) PCT No.: PCT/JP2020/024188
§ 371 (c)(1),
(2) Date: Jan. 7, 2022

(87) PCT Pub. No.: WO2021/010088
PCT Pub. Date: Jan. 21, 2021

(65) Prior Publication Data
US 2022/0261161 A1 Aug. 18, 2022

(30) Foreign Application Priority Data
Jul. 18, 2019 (JP) .................................. 2019-132761

(51) Int. Cl.
*G06F 3/06* (2006.01)

(52) U.S. Cl.
CPC .......... *G06F 3/0619* (2013.01); *G06F 3/0655* (2013.01); *G06F 3/0673* (2013.01)

(58) Field of Classification Search
CPC ............. G06F 2212/401; G06F 3/0619; G06F 3/0614; G06F 3/0617; G06F 3/0616; G06F 2211/109; G06F 2212/403; G06F 2212/402
See application file for complete search history.

(56) References Cited

U.S. PATENT DOCUMENTS

| | | | |
|---|---|---|---|
| 2013/0282953 A1* | 10/2013 | Orme ...................... | H04L 12/66 711/102 |
| 2016/0224241 A1 | 8/2016 | Verrilli et al. | |
| 2018/0074893 A1* | 3/2018 | Vaidhyanathan ...... | G11C 29/52 |
| 2018/0181337 A1* | 6/2018 | Durham .................. | G06F 21/79 |

FOREIGN PATENT DOCUMENTS

| JP | H02-104078 A | 4/1990 |
|---|---|---|
| JP | H05-189360 A | 7/1993 |
| JP | 2018-503924 A | 2/2018 |

OTHER PUBLICATIONS

International Search Report for PCT Application No. PCT/JP2020/024188, dated Jul. 21, 2020.
Japanese Office Action for JP Application No. 2021-532739, dated Nov. 15, 2022 with English Translation.

* cited by examiner

*Primary Examiner* — Zhuo H Li

(57) ABSTRACT

A memory control device 100 of the present invention includes a data storage processing unit 101 that stores, in an additional data area that is an area for storing additional data in memory-stored data including compressed data and the additional data to be stored in a memory, an error correcting code of the compressed data and compression information representing the degree of compression of the compressed data, and a read processing unit 102 that controls readout of the memory-stored data on the basis of the degree of compression represented by the compression information in the additional data area of the memory-stored data, when reading out the memory-stored data from the memory.

11 Claims, 12 Drawing Sheets

Fig.1

| Data 64bit | ECC 8bit | Data 64bit | ECC 8bit | Data 64bit | ECC 8bit | Data 64bit | ECC 8bit | Data 64bit | ECC 8bit | Data 64bit | ECC 8bit | Data 64bit | ECC 8bit | Data 64bit | ECC 8bit |

MEMORY CONTROL METHOD, MEMORY CONTROL DEVICE, PROGRAM

This application is a National Stage Entry of PCT/JP2020/024188 filed on Jun. 19, 2020, which claims priority from Japanese Patent Application 2019-132761 filed on Jul. 18, 2019, the contents of all of which are incorporated herein by reference, in their entirety.

TECHNICAL FIELD

The present invention relates to a memory control method, a memory control device, and a program, for controlling data to be compressed and stored in a memory.

BACKGROUND ART

A processor transfers data from an external memory and a cache memory, and performs arithmetic processing on the data. Therefore, the arithmetic processing performance on the data is affected by the memory band. Particularly, in a vector processor, since a plurality of units of arithmetic processing are performed in parallel, a plurality of operands for arithmetic operation are required. Accordingly, it is more likely to be affected by the memory band. Further, while the memory capacity of an external memory tends to be increased recently, the memory band is not increased along with the memory capacity. Therefore, in order to improve the arithmetic processing performance by a processor, it is necessary to increase the memory band.

Patent Literature 1: JP 2018-503924 A

SUMMARY

Patent Literature 1 discloses compressing data to be stored in an external memory and increasing the memory band. However, the art described in Patent Literature 1 causes the following inconvenience.

First, in Patent Literature 1, the memory compression rate of an external memory is held using a bit field where an Error Correcting Code (ECC) with respect to data is stored. As an example, FIG. 1 illustrates a data structure of data and an ECC on a memory in Patent Literature 1. In this case, with respect to 64-bit data that is the data itself, an 8-bit ECC is held, and the data and the ECC are held in the order of data, ECC, data, ECC, . . . on the memory.

However, in order to perform 1-bit error correction and 2-bit error detection with respect to 64-bit data, an 8-bit ECC is needed. Therefore, when the memory compression rate is stored in part or whole of the bit field of the ECC, there arises a problem that 1-bit error correction and 2-bit error detection of data cannot be performed so that protection cannot be made with the ECC.

In the Patent Literature 1 having the data structure as described above, the memory access sequence is as described below.
(1) Read the leading ECC 1 byte. The subsequent ECC field may be used depending on the memory compression rate.
(2) Read memory compression rate from the ECC, and determine the remaining number of times of accesses required with respect to the memory line.
(3) Perform the Remaining Memory Accesses.

However, in the case of accessing the memory as described above, first, an ECC is read, and then the number of remaining accesses is determined. Therefore, it is necessary to read the ECC before reading data, which requires an unnecessary memory access. This causes a problem of an increase in the memory access latency.

Further, in the case of not using any ECC bit as a storing location of the memory compression rate as illustrated in FIG. 1, for example, a memory compression rate 12' is held in a Translation Lookaside Buffer (TLB) 12 in the processor as illustrated in FIG. 2. However, in the case of holding the memory compression rate in the processor, such an area must be secured in the processor, which causes a problem that an extra hardware resource is required.

As described above, a method of holding the memory compression rate in the ECC or in the processor in order to increase the memory band causes problems such as deterioration in data reliability because data cannot be protected with ECC, an increase in the memory access latency due to an unnecessary memory access, and a cost increase for securing an extra hardware resource.

In view of the above, an object of the present invention is to provide a memory control method, a memory control device, and a program which enable the above-described problems to be solved.

A memory control method, according to one aspect of the present invention, is configured to include
storing, in an additional data area that is an area for storing additional data in memory-stored data including compressed data and the additional data to be stored in a memory, an error correcting code of the compressed data and compression information representing the degree of compression of the compressed data, and
when reading out the memory-stored data from the memory, controlling readout of the memory-stored data on the basis of the degree of compression represented by the compression information in the additional data area of the memory-stored data.

Further, a memory control device, according to one aspect of the present invention, is configured to include
a data storage processing unit that stores, in an additional data area that is an area for storing additional data in memory-stored data including compressed data and the additional data to be stored in a memory, an error correcting code of the compressed data and compression information representing the degree of compression of the compressed data, and
a read processing unit that controls readout of the memory-stored data on the basis of the degree of compression represented by the compression information in the additional data area of the memory-stored data, when reading out the memory-stored data from the memory.

Further, a program, according to one aspect of the present invention, is configured to cause a memory control device to realize
a data storage processing unit that stores, in an additional data area that is an area for storing additional data in memory-stored data including compressed data and the additional data to be stored in a memory, an error correcting code of the compressed data and compression information representing the degree of compression of the compressed data, and
a read processing unit that controls readout of the memory-stored data on the basis of the degree of compression represented by the compression information in the additional data area of the memory-stored data, when reading out the memory-stored data from the memory.

Further, a data structure, according to one aspect of the present invention, is a data structure of memory-stored data including compressed data and additional data to be stored in a memory. The data structure is configured to include a compressed data storage area that is an area for storing the compressed data, and an additional data area that is an area for storing the additional data.

In the additional data area, an error correcting code of the compressed data and compression information representing the degree of compression of the compressed data are stored.

Since the present invention is configured as described above, the memory band can be utilized efficiently.

BRIEF DESCRIPTION OF DRAWINGS

FIG. 1 is an illustration for explaining the background art of the present invention.

EXEMPLARY EMBODIMENTS

First Exemplary Embodiment

Figure 2:
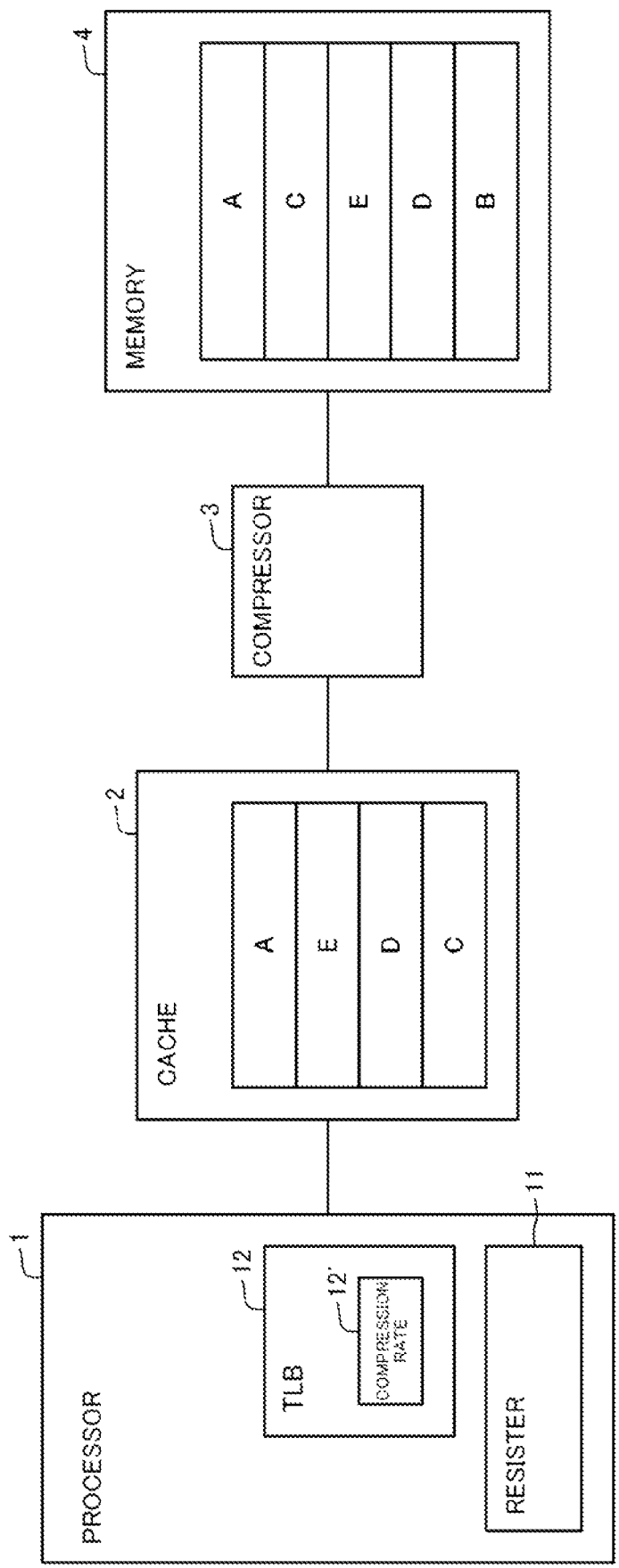
FIG. 2 is an illustration for explaining the background art of the present invention.
Figure 3:
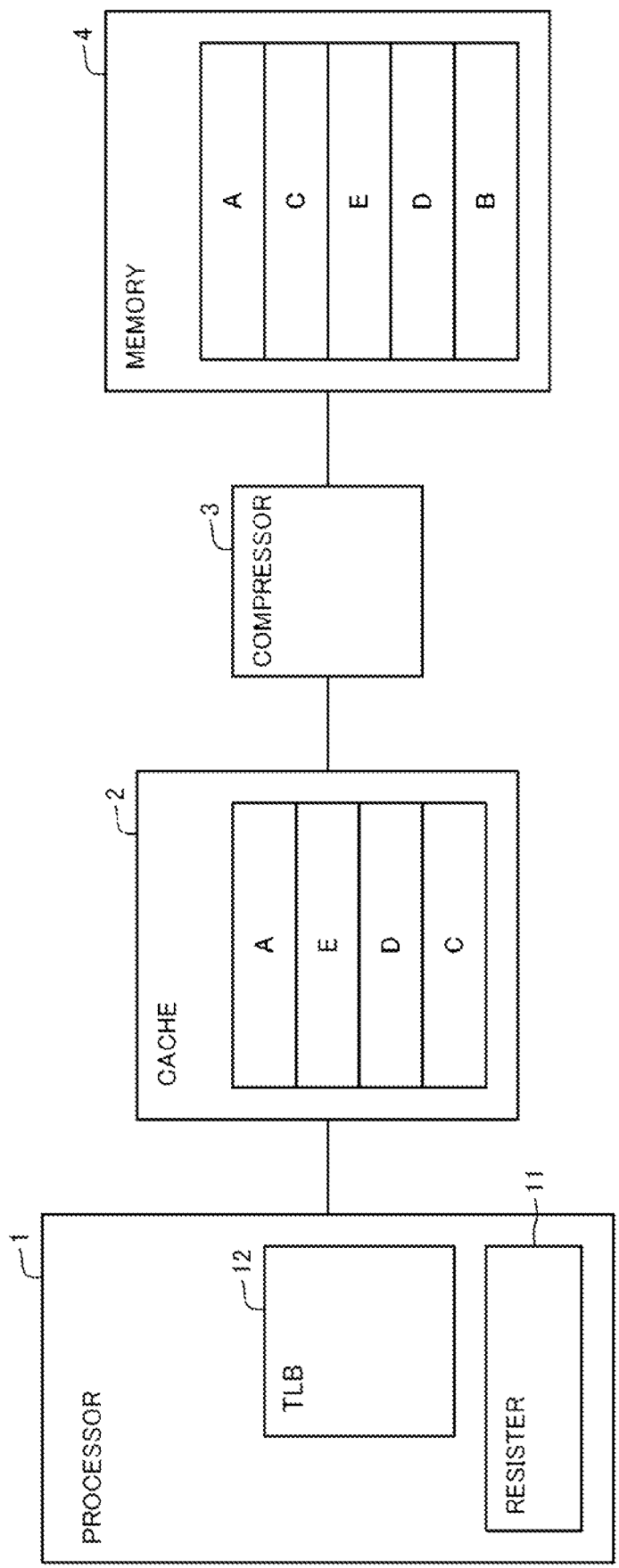
FIG. 3 is a diagram illustrating a configuration of an information processing system according to a first exemplary embodiment of the present invention.
Figure 4:
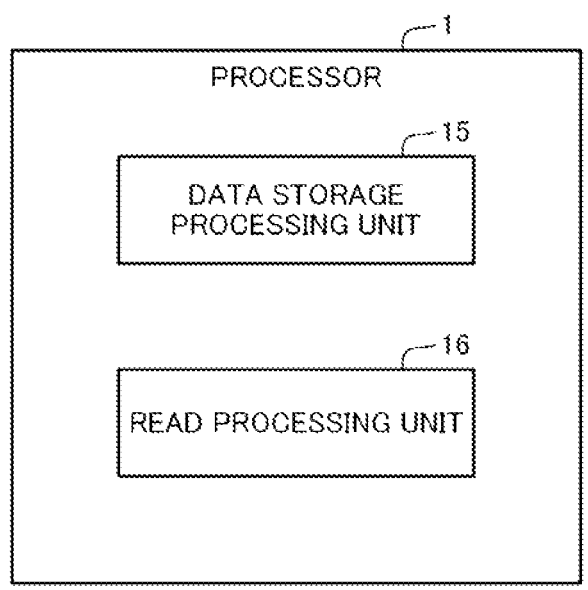
FIG. 4 is a function block diagram illustrating a configuration of the processor disclosed in FIG. 3.
Figure 5:
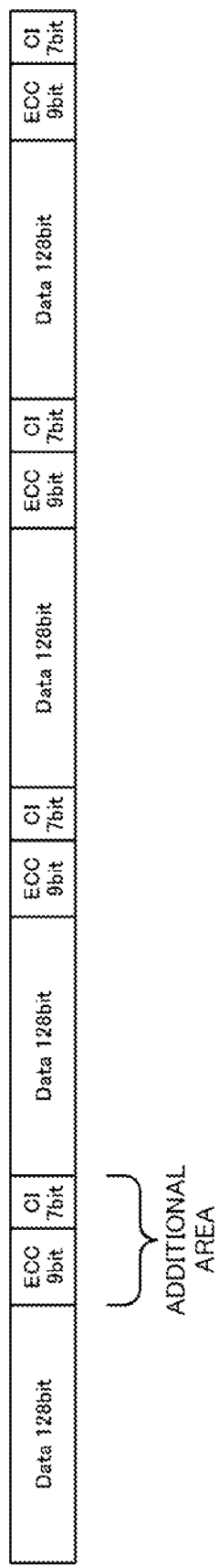
FIG. 5 illustrates a data structure of data stored in the memory disclosed in FIG. 3.

A first exemplary embodiment of the present invention will be described with reference to FIGS. 3 to 11. FIGS. 3 to 5 are diagrams for explaining a configuration of the present invention, and FIGS. 6 to 11 are diagrams for explaining operation of the present invention.

As illustrated in FIG. 3, an information processing system of the present invention includes a processor 1, a cache 2, a compressor 3, and a memory 4. The processor 1 includes a register 11 for holding data, a TLB 12 that is a conversion table between a logical address and a physical address, and an arithmetic unit (not illustrated) for operating data. The arithmetic unit of the processor 1 includes a data storage processing unit 15 and a read processing unit 16 that are constructed by execution of a program, as illustrated in FIG. 4.

The cache 2 is a storage device that temporarily stores data read out from the memory 4. The compressor 3 compresses data when the data is written from the cache 2 into the memory 4, and restores data when the data is read from the memory 4 to the cache 2. The memory 4 is an external storage device for storing data therein. It is assumed that the cache line width of the cache 2 is 512 bytes that is the same as the memory line width of the memory 4. Therefore, the cache line and the memory line correspond to each other in one to one relationship, and it is not necessary to convert the physical address, to be accessed by the processor 1, for compression. Further, since the cache line width and the memory line width each have the same 512 bytes, even when the data of the cache 2 is compressed, it will not overflow from the memory line, and even when the data on the memory line is restored, it will not overflow from the cache line.

Next, the data structure of memory-stored data that is data to be stored in the memory 4 will be described with reference to FIG. 5. The memory-stored data to be stored in the memory 4 includes a 128-bit data area (compressed data storage area) for storing compressed data in which data body to be stored in the memory is compressed, and a 16-bit additional area (additional data storage area) for storing additional data of the compressed data. The data area and the additional area are alternatively held on the memory 4. The 16-bit additional area functions as an area for storing an error correcting code (ECC) with respect to the compressed data held in the data area. Specifically, as illustrated in FIG. 5, the 16-bit additional area includes a 9-bit ECC area and a 7-bit compression indicator (CI) area.

As described above, for an ECC (error correcting core) that enables 1-bit error correction and 2-bit error detection with respect to compressed data stored in the 128-bit data area, 9 bits are enough. In the present invention, a 16-bit additional area that is larger than 9 bits is prepared, so that the area is divided into a 9-bit ECC area and a 7-bit CI area. In other words, in the 16-bit additional area for storing the ECC, 9 bits are used by the ECC, while 7 bits are unused. In the present invention, in the 7-bit CI area, a compression rate that is information representing the degree of compression of the compressed data (compression information) is held. That is, the compression rate of each memory line is stored in the CI area in the first additional area of each memory line. While the CI area has 7 bits, the information representing the compression rate is not limited to 7 bits, and may be less than 7 bits.

Storage of the compression rate into the CI area is performed by the data storage processing unit 15 of the processor 1. For example, the data storage processing unit 15 issues a Store command for data stored in the register 11, to a predetermined address of the memory 4. In response to the command, the data stored in the register 11 is transferred to the cache 2, and is transferred to the compressor 3 from the cache 2 for transfer to the memory 4. Then, the data is compressed by the compressor 3, and is stored in the predetermined address in the memory 4. At that time, the memory-stored data stored in the memory 4 has a data structure as illustrated in FIG. 5. The compressed data is stored in the 128-bit data area, the ECC thereof is stored in the 9-bit ECC area, and the compression rate of the compression data is stored in the 7-bit CI area.

Here, when performing data compression by hardware such as the compressor 3 as described above, it is possible to perform compression by ½, ¼, or ⅛. In the present invention, it is assumed that a unit of data capacity to be compressed is 512 bytes that is the same as the cache line width. When compressing 512 bytes, it is possible to compress data that can be compressed to ½ to be 256 bytes, compress data that can be compressed to ¼ to be 128 bytes, and compress data that can be compressed to ⅛ to be 64 bytes. For example, in the case of 64-byte data compressed to ⅛, it is accommodated in four data areas each having 128 bits as illustrated in FIG. 5.

Then, the memory-stored data having been compressed as described above and stored in the memory 4 with the compression rate is read out by the read processing unit 16 of the processor 1. For example, the read processing unit 16 issues a Load command for data to a predetermined address of the memory 4. Then, the memory-stored data of the predetermined address is transferred from the memory 4 to the compressor 3, and the compressed data is restored by the compressor 3. Then, the restored data is written into the cache 2, and is transferred to the register 11 of the processor 1 as a reply to the Load command. At that time, the read processing unit 16 performs 64-byte Burst Read so as to utilize the memory band of the memory 4 at the maximum in the memory access. In 64-byte Burst Read, memory access is made to the memory 4 by dividing into (8-byte Read+1-byte ECC)×8 times. In one 64-byte Burst Read, the compression rate of the data is stored in the CI area of the 16-bit, that is, 2-byte, additional area of the first readout data. Therefore, with respect to the memory line, the read processing unit 16 determines the compression rate from the first 2-byte CI area, and determines the remaining times of issuance of 64-byte Burst Read required to perform read processing. This can increase the memory band.

For example, when the memory line is compressed to ⅛, after the first 64-byte Burst Read, no data remains in the memory line. Therefore, there is no need to issue Read. When the memory line is compressed to ¼, after the first 64-byte Burst Read, another 64-byte Burst Read is issued to read data. When the memory line is compressed to ½, after the first 64-byte Burst Read, 64-byte Burst Read is issued three more times to read data. As described above, when the memory line is compressed to ⅛, a memory band that is eight time larger can be generated. When the memory line is compressed to ¼, a memory band that is four time larger can be generated. When the memory line is compressed to ½, a memory band that is two time larger can be generated. In the case of ⅛ that is the maximum compression rate, the cache line width is 512 bytes, and 64 bytes are stored in the memory line in a compressed state. Therefore, the first 64-byte Burst Read is absolutely necessary, and the first 64-byte Burst Read will never be wasted.

As described above, when the processor 1 reads data from the memory 4, the processor 1 determines the number of times of performing 64-byte Burst Read, on the basis of the compression rate read out by the first 64-byte Burst Read, the preset data capacity before compression (512 bytes), and the preset read capacity of one-time read processing (64 bytes). Then, by performing 64-byte Burst Read the determined number of times, data can be read out. Note that in the present invention, when reading memory-stored data from the memory 4, reading is performed by burst transfer of data of a predetermined capacity such as 64 bytes. However, the read processing may be performed by burst transfer of another capacity, and the read processing may be performed by a method other than burst transfer.

Figure 6:
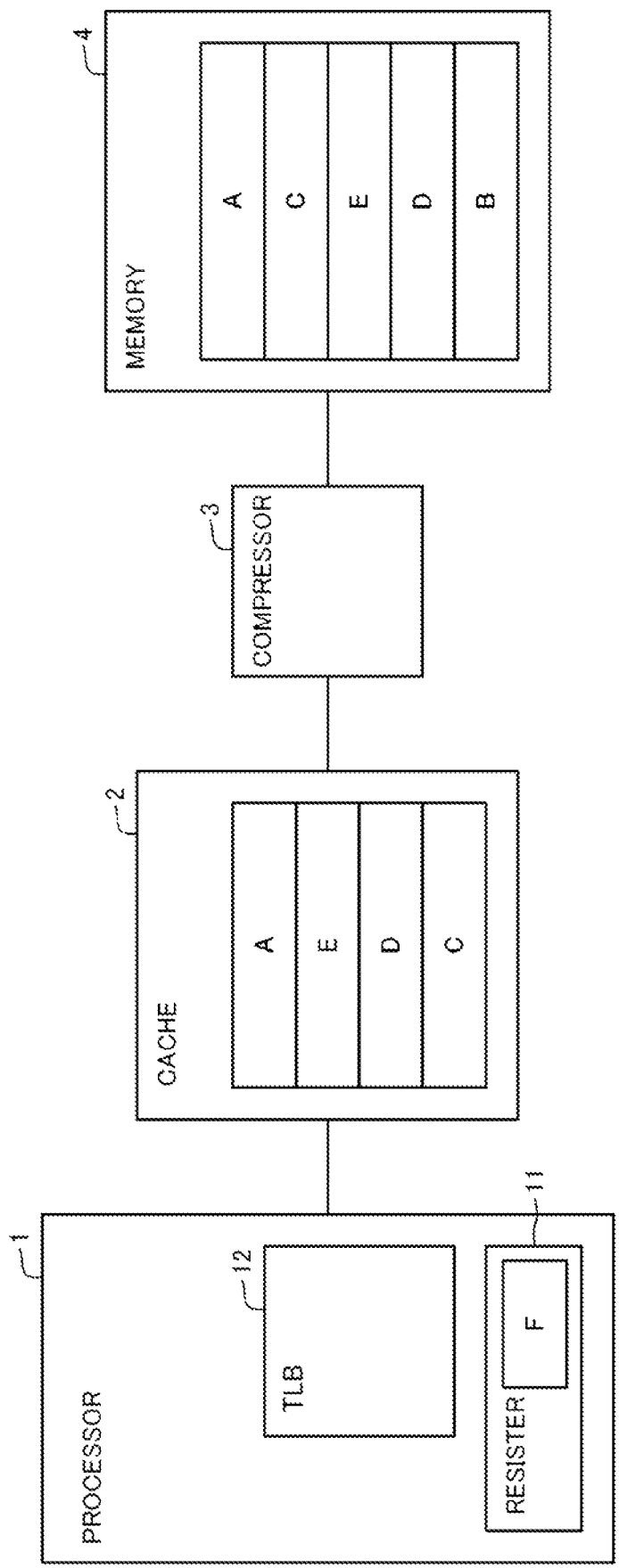
FIG. 6 is a diagram illustrating an operation of reading data from a memory by the information processing system disclosed in FIG. 3.
Figure 7:
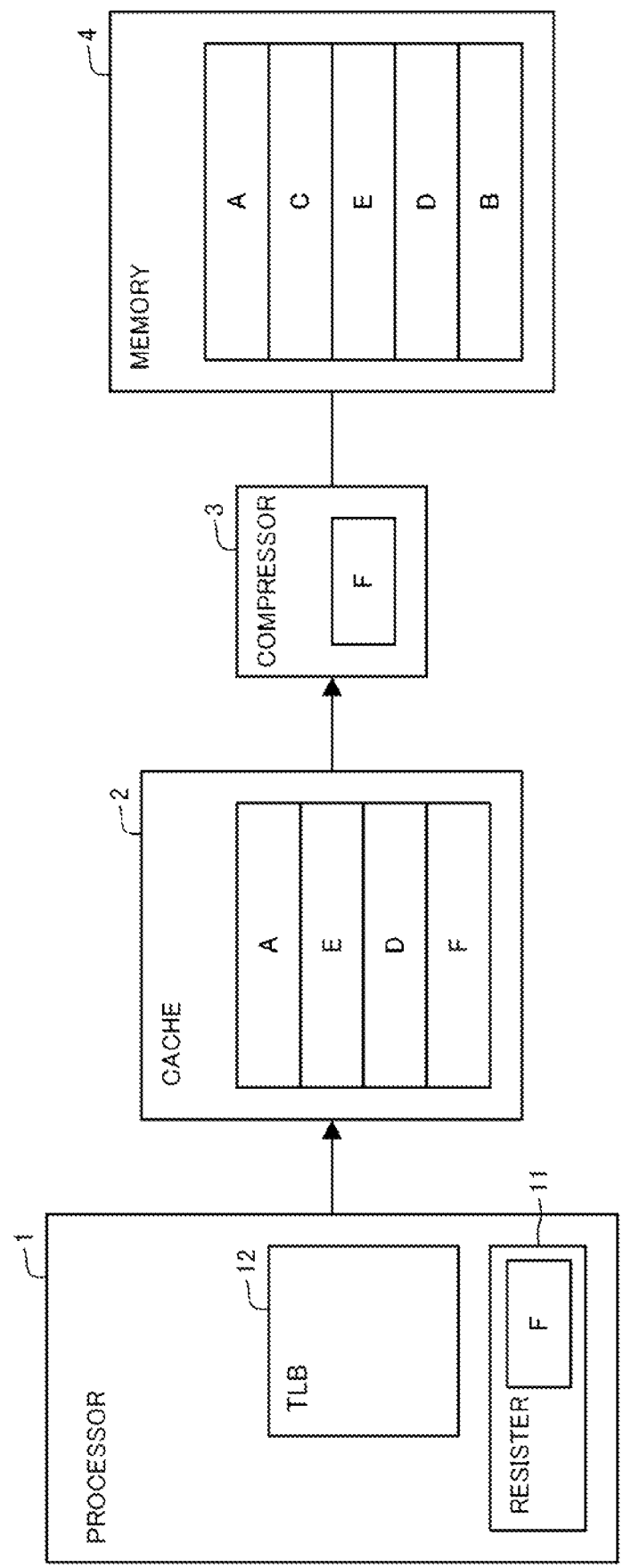
FIG. 7 is a diagram illustrating an operation of reading data from a memory by the information processing system disclosed in FIG. 3.
Figure 8:
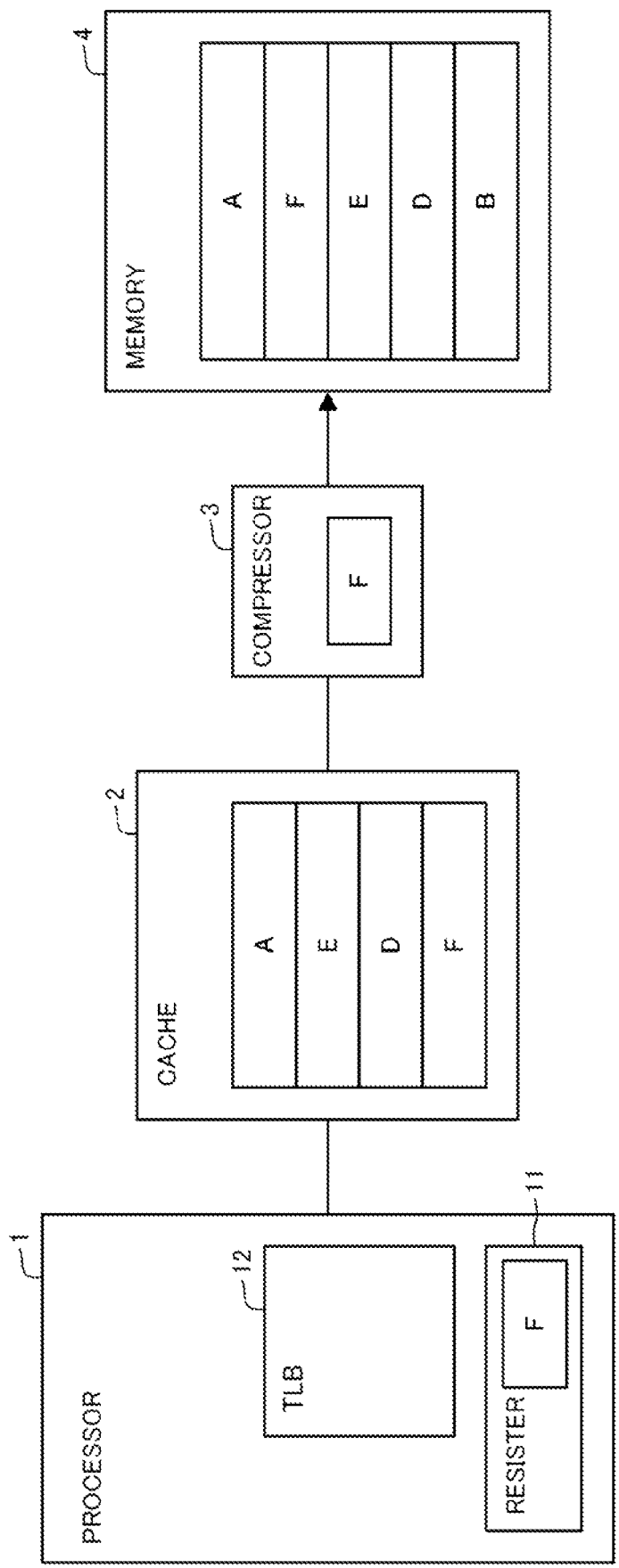
FIG. 8 is a diagram illustrating an operation of reading data from a memory by the information processing system disclosed in FIG. 3.

Next, an operation of storing data in the memory 4 by the processor 1 of the present invention will be described with reference to FIGS. 6 to 8. First, as shown by an arrow in FIG. 6, a Store command for data in the register 11 is issued from the processor 1 to an address F of the memory 4. Then, as illustrated in FIG. 7, the data of the address F is transferred from the register 11 to the cache 2, and in order to transfer to the memory 4 from the cache 2, the data of the address F is transferred to the compressor 3. The compressor 3 compresses the data of the address F. Then, as illustrated in FIG. 8, the data of the address F, compressed by the compressor 3, is written to the address F of the memory 4. At that time, the memory-stored data stored in the memory 4 has the data structure as illustrated in FIG. 5. The compressed data is stored in the 128-bit data area, the ECC thereof is stored in the 9-bit ECC area, and the compression rate of the compressed data is stored in the 7-bit CI area. Therefore, the compression rate is not needed to be held in the processor 1, and is held in the memory 4.

Figure 9:
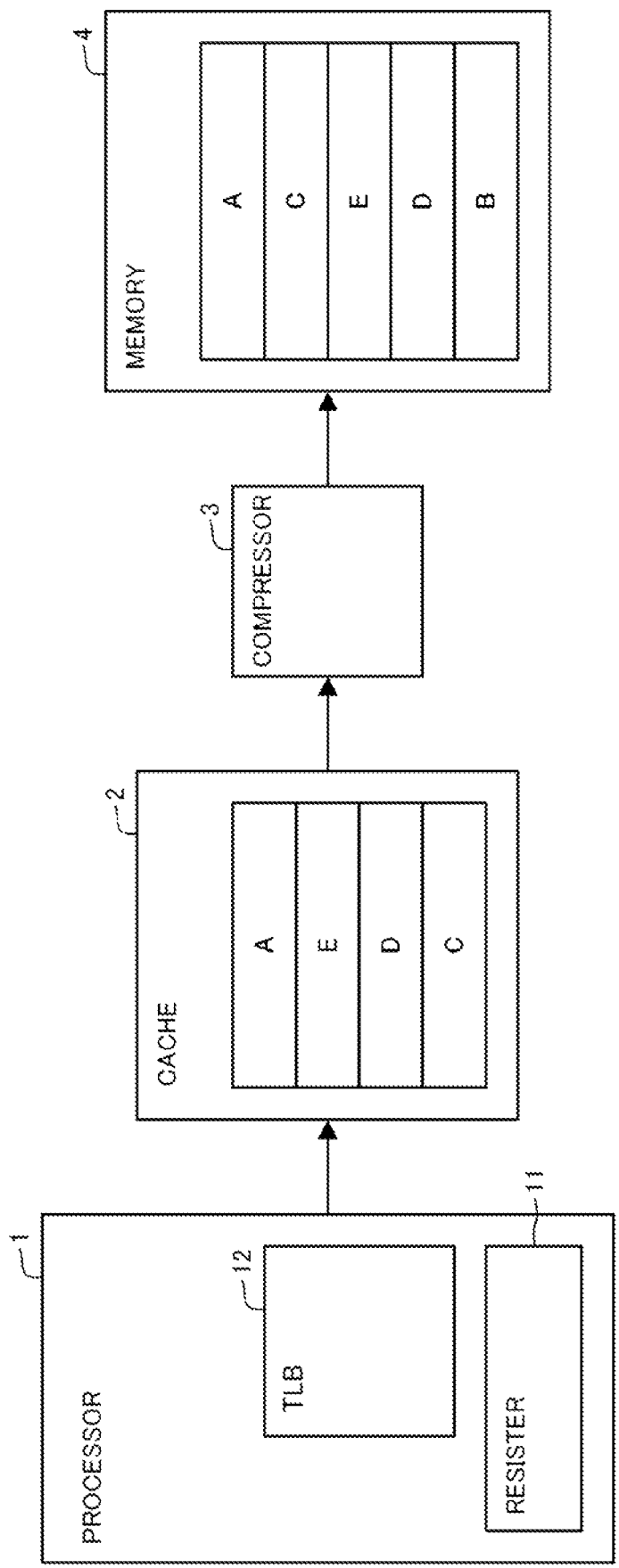
FIG. 9 is a diagram illustrating an operation of storing data in a memory by the information processing system disclosed in FIG. 3.
Figure 10:
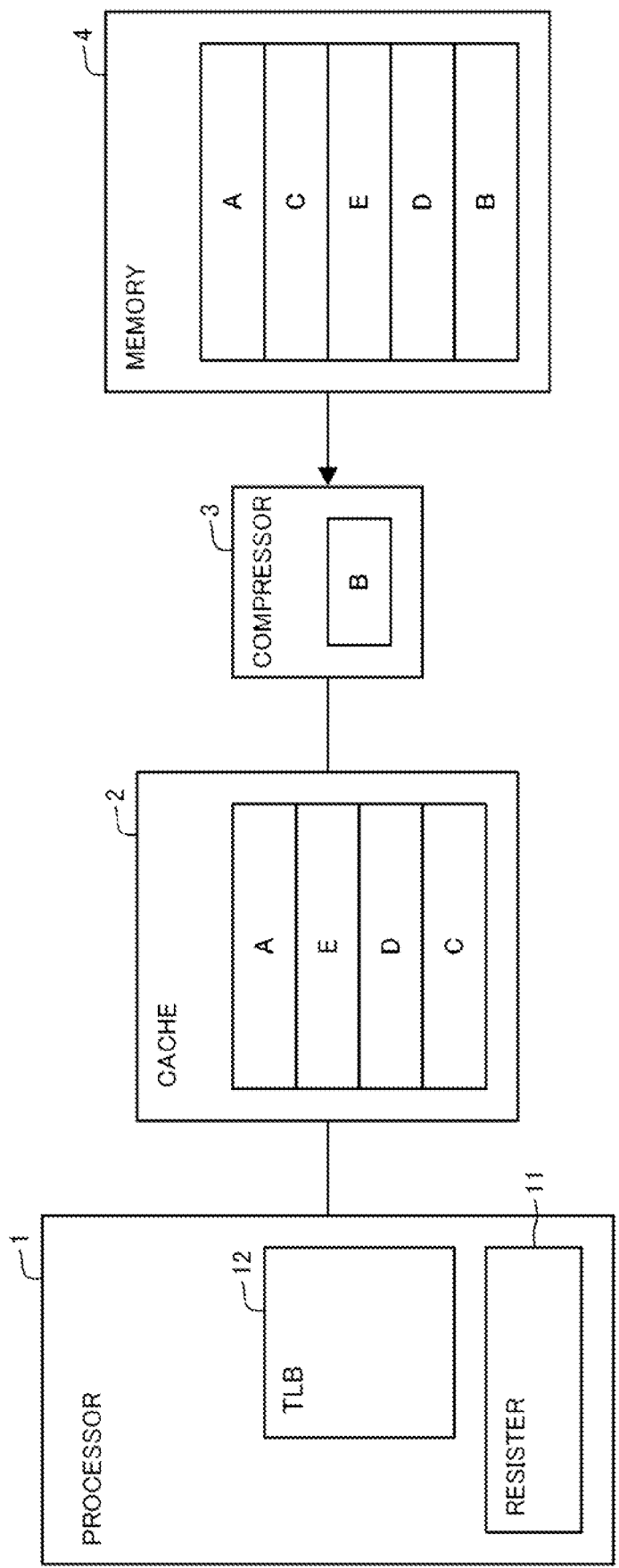
FIG. 10 is a diagram illustrating an operation of storing data in a memory by the information processing system disclosed in FIG. 3.
Figure 11:
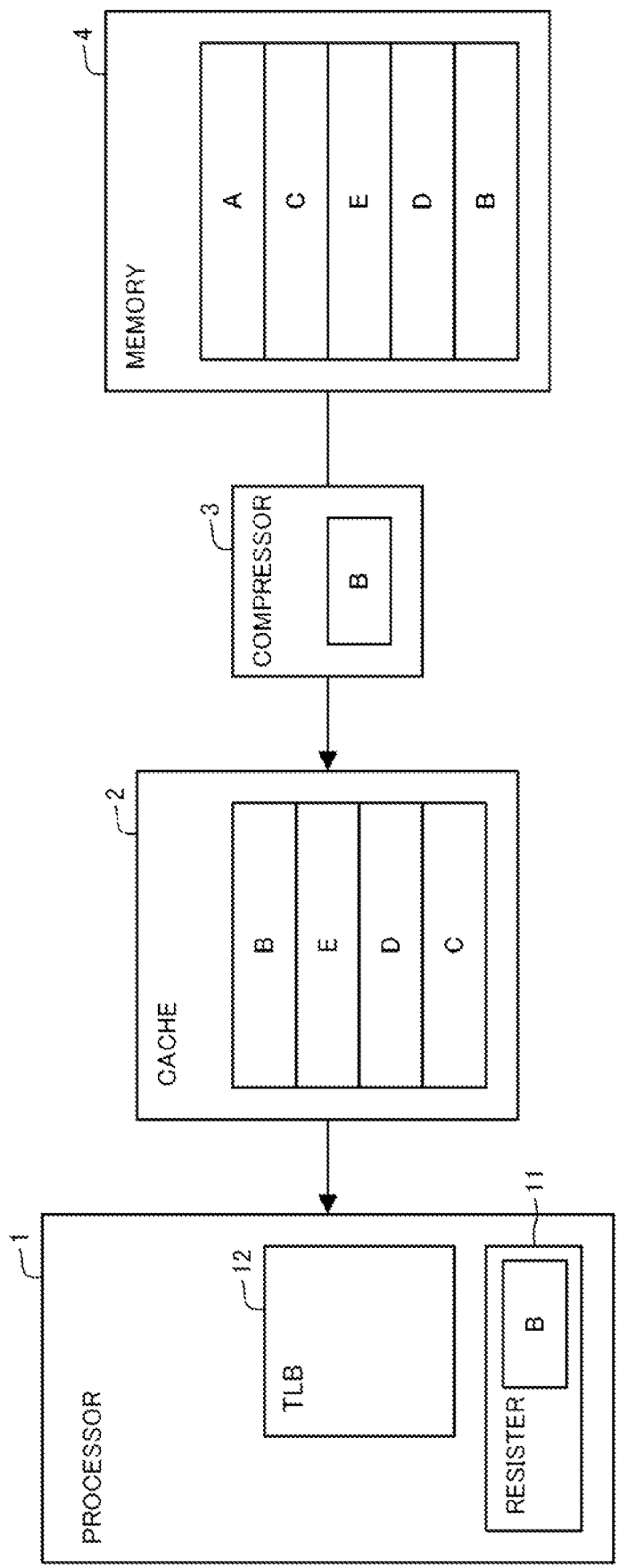
FIG. 11 is a diagram illustrating an operation of storing data in a memory by the information processing system disclosed in FIG. 3.

Next, an operation of reading data from the memory 4 by the processor 1 of the present invention will be described with reference to FIGS. 9 to 11. First, as shown by an arrow in FIG. 9, a Load command with respect to data of an address B of the memory 4 is issued from the processor 1 to the memory 4. Then, as illustrated in FIG. 10, the data of the address B is transferred from the memory 4 to the compressor 3. Then, as illustrated in FIG. 11, the compressed data of the address B is restored by the compressor 3, is written into the cache 2, and is transferred to the register 11 of the processor as a reply to the Load command. At that time, in order to allow the memory band of the memory 4 to be utilized at the maximum in memory access, the processor 1 performs 64-byte Burst Read. The compression rate of the data is stored in the CI area of the 2-byte additional area of the first readout data. Therefore, with respect to the memory line, the read processing unit 16 determines the compression rate from the first 2-byte CI area, and determines the remaining number of times of issuance of 64-byte Burst Read. Then, by performing 64-byte Burst Read the determined number of times, the data of the address B can be read out.

As described above, in the present invention, the memory compression rate of the external memory is held on the memory by using the CI area that is unused bits of the ECC with respect to the data. Then, for reading the data, a memory access is performed by Burst Read, and from the CI area read by the first Burst Read, the memory compression rate of the memory line is determined, and the remaining number of times of issuance of Burst Read that is required for reading is determined. Thereby, it is possible to eliminate unnecessary memory access for checking the memory compression rate. Further, by performing memory compression, it is possible to increase the memory band. Further, since the memory compression rate is held on the memory, it is not necessary to hold it in the processor, so that it is not necessary to secure an extra hardware resource for the memory compression rate.

Second Exemplary Embodiment

Figure 12:
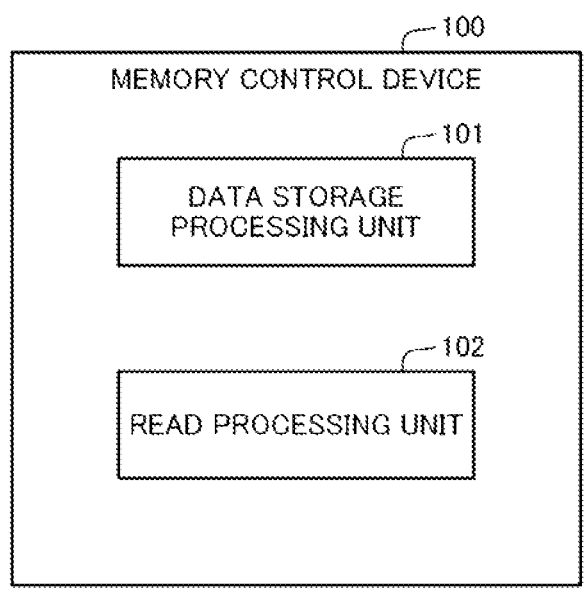
FIG. 12 is a diagram illustrating a configuration of a memory control device according to a second exemplary embodiment of the present invention.

Next, a second exemplary embodiment of the present invention will be described with reference to FIG. 12. FIG. 12 is a block diagram illustrating a configuration of a memory control device according to the present embodiment. Note that the present embodiment shows the outline of the configuration of the information processing system described in the first exemplary embodiment.

As illustrated in FIG. 12, the memory control device 100 of the present embodiment is configured to include
    a data storage processing unit 101 that stores, in an additional data area that is an area for storing additional data in memory-stored data including compressed data and the additional data to be stored in a memory, an error correcting code of the compressed data and compression information representing the degree of compression of the compressed data, and a read processing unit 102 that controls reading of the memory-stored data on the basis of the degree of compression represented by the compression information in the additional data area of the memory-stored data, when reading out the memory-stored data from the memory.

Note that the data storage processing unit 101 and the read processing unit 102 are implemented by execution of a program by the memory control device 100.

As a memory control method, the memory control device 100 having the above-described configuration operates to perform processing to store, in an additional data area that is an area for storing additional data in memory-stored data including compressed data and the additional data to be stored in a memory, an error correcting code of the compressed data and compression information representing the degree of compression of the compressed data, and when reading out the memory-stored data from the memory, control reading of the memory-stored data on the basis of the degree of compression represented by the compression information in the additional data area of the memory-stored data.

As described above, according to the present invention, in an additional data area in memory-stored data that is compressed and stored in the memory, compression information representing the degree of compression of the compressed data is stored together with an error correcting code. Thereby, when reading out the memory-stored data, it is possible to protect the data with the error correcting code and to perform efficient readout on the basis of the readout compression information. As a result, it is possible to suppress deterioration of data reliability and to suppress an increase in the memory access latency. Further, since the compression information is not stored in another hardware resource such as a processor, it is also possible to suppress a cost increase for securing a hardware resource.

<Supplementary Notes>

The whole or part of the exemplary embodiments disclosed above can be described as the following supplementary notes. Hereinafter, outlines of the configurations of a memory control method, a memory control device, and a program, according to the present invention, will be described. However, the present invention is not limited to the configurations described below.

(Supplementary Note 1)

A memory control method comprising:

storing, in an additional data area that is an area for storing additional data in memory-stored data including compressed data and the additional data to be stored in a memory, an error correcting code of the compressed data and compression information representing a degree of compression of the compressed data; and when reading out the memory-stored data from the memory, controlling readout of the memory-stored data on a basis of the degree of compression represented by the compression information in the additional data area of the memory-stored data.

(Supplementary Note 2)

The memory control method according to supplementary note 1, further comprising storing the compression information in the additional data area together with the error correcting code having a number of bits that enables one-bit error correction and two-bit error detection corresponding to a number of bits of the compressed data.

(Supplementary Note 3)

The memory control method according to supplementary note 1 or 2, further comprising storing the error correcting code in the additional data area, the additional data area being an area having a larger number of bits than a number of bits of the error correcting code that enables one-bit error correction and two-bit error detection corresponding to a number of bits of the compressed data, and storing the compression information in an unused area of the additional data area.

(Supplementary Note 4)

The memory control method according to any of supplementary notes 1 to 3, further comprising when reading out the memory-stored data from the memory, reading out the memory-stored data by performing a readout process a number of times based on the degree of compression represented by the compression information in the additional data area.

(Supplementary Note 5)

The memory control method according to supplementary note 4, further comprising when reading out the memory-stored data from the memory, determining a number of times of performing the readout process on a basis of a data capacity before compression, a read capacity of one readout process, and the degree of compression represented by the compression information in the additional data area, and reading out the memory-stored data by performing the readout process the determined number of times.

(Supplementary Note 6)

The memory control method according to supplementary note 5, further comprising when reading out the memory-stored data from the memory, reading out the memory-stored data by performing the readout process by burst transfer of data of a predetermined capacity the determined number of times.

(Supplementary Note 7)

The memory control method according to any of supplementary notes 1 to 6, further comprising storing, in the additional data area having 16 bits, the error correcting code having 9 bits corresponding to the compressed data having 128 bits, and the compression information having 7 bits at most.

(Supplementary Note 8)

A memory control device comprising:

a data storage processing unit that stores, in an additional data area that is an area for storing additional data in memory-stored data including compressed data and the additional data to be stored in a memory, an error correcting code of the compressed data and compression information representing a degree of compression of the compressed data; and a read processing unit that controls readout of the memory-stored data on a basis of the degree of compression represented by the compression information in the additional data area of the memory-stored data, when reading out the memory-stored data from the memory.

(Supplementary Note 8-1)

The memory control device according to supplementary note 8, wherein the data storage processing unit stores the compression information in the additional data area together with the error correcting code having a number of bits that enables one-bit error correction and two-bit error detection corresponding to a number of bits of the compressed data.

(Supplementary Note 8-2)

The memory control device according to supplementary note 8 or 8-1, wherein the data storage processing unit stores the error correcting code in the additional data area, the additional data area being an area having a larger number of bits than a number of bits of the error correcting code that enables one-bit error correction and two-bit error detection corresponding to a number of bits of the compressed data, and stores the compression information in an unused area of the additional data area.

(Supplementary Note 8-3)

The memory control device according to any of supplementary notes 8 to 8-2, wherein when reading out the memory-stored data from the memory, the read processing unit reads out the memory-stored data by performing a readout process a number of times based on the degree of compression represented by the compression information in the additional data area.

(Supplementary Note 8-4)

The memory control device according to supplementary note 8-3, wherein when reading out the memory-stored data from the memory, the read processing unit determines a number of times of performing the readout process on a basis of a data capacity before compression, a read capacity of one readout process, and the degree of compression represented by the compression information in the additional data area, and reads out the memory-stored data by performing the readout process the determined number of times.

(Supplementary Note 8-5)

The memory control device according to supplementary note 8-4, wherein when reading out the memory-stored data from the memory, the read processing unit reads out the memory-stored data by performing the readout process by burst transfer of data of a predetermined capacity the determined number of times.

(Supplementary Note 8-6)

The memory control device according to any of supplementary notes 8 to 8-5, wherein the data storage processing unit stores, in the additional data area having 16 bits, the error correcting code having 9 bits corresponding to the compressed data having 128 bits, and the compression information having 7 bits at most.

(Supplementary Note 9)

A program for causing a memory control device to realize a data storage processing unit that stores, in an additional data area that is an area for storing additional data in memory-stored data including compressed data and the additional data to be stored in a memory, an error correcting code of the compressed data and compression information representing a degree of compression of the compressed data; and a read processing unit that controls readout of the memory-stored data on a basis of the degree of compression represented by the compression information in the additional data area of the memory-stored data, when reading out the memory-stored data from the memory.

(Supplementary Note 10)

A data structure of memory-stored data including compressed data and additional data to be stored in a memory, the data structure comprising a compressed data storage area that is an area for storing the compressed data, and an additional data area that is an area for storing the additional data, wherein in the additional data area, an error correcting code of the compressed data and compression information representing a degree of compression of the compressed data are stored.

(Supplementary Note 10-1)

The data structure according to supplementary note 10, wherein in the additional data area, the error correcting code, having a number of bits that enables one-bit error correction and two-bit error detection corresponding to a number of bits of the compressed data, and the compression information are stored.

(Supplementary Note 10-2)

The data structure according to supplementary note 10 or 10-1, wherein the additional data area is formed as an area having a larger number of bits than a number of bits of the error correcting code that enables one-bit error correction and two-bit error detection corresponding to a number of bits of the compressed data, and the error correcting code is stored in the additional data area and the compression information is stored in an unused area in the additional data area.

(Supplementary Note 10-3)

The data structure according to any of supplementary notes 10 to 10-2, wherein the compressed data storage area is formed to have 128 bits, and the additional data area is formed to have 16 bits, and in the additional data area, the error correcting code having 9 bits corresponding to the compressed data having 128 bits, and the compression information having 7 bits at most, are stored.

Note that the program described above is stored using a non-transitory computer readable medium of any type, and can be supplied to a computer. Non-transitory computer readable media include a tangible storage medium of any type. Examples of non-transitory computer readable media include a magnetic recording medium (for example, flexible disk, magnetic tape, hard disk drive), a magneto-optical recording medium (for example, magneto-optical disk), a CD-ROM (Read Only Memory), a CD-R, a CD-R/W, and a semiconductor memory (for example, a mask ROM, a PROM (Programmable ROM), an EPROM (Erasable PROM), a flash ROM, and a RAM (Random Access Memory)). Further, the program may be supplied to a computer by a transitory computer readable medium of any type. Examples of transitory computer readable media include an electrical signal, an optical signal, and an electromagnetic wave. A transitory computer readable medium can supply the program to a computer via a wired communication channel such as an electric wire or an optical fiber, or a wireless communication channel.

While the present invention has been described with reference to the exemplary embodiments described above, the present invention is not limited to the above-described embodiments. The form and details of the present invention can be changed within the scope of the present invention in various manners that can be understood by those skilled in the art.

The present invention is based upon and claims the benefit of priority from Japanese patent application No. 2019-132761, filed on Jul. 18, 2019, the disclosure of which is incorporated herein in its entirety by reference.

REFERENCE SIGNS LIST 1 processor
11 register
12 TLB
15 data storage processing unit
16 read processing unit
2 cache
3 compressor
4 memory
100 memory control device
101 data storage processing unit
102 read processing unit

What is claimed is:

1. A memory control method comprising:
storing additional data in an additional data area of memory-stored data of a memory including compressed data, the additional data including an error correcting code of the compressed data and compression information representing a degree of compression of the compressed data; and
when reading out the memory-stored data from the memory, performing a readout process a number of times based on the degree of compression represented by the compression information in the additional data area, wherein
the number of times that the readout process is performed is determined when reading out the memory-stored data from the memory on a basis of a data capacity before compression, a read capacity of one readout process, and the degree of compression represented by the compression information in the additional data area.

2. The memory control method according to claim 1, further comprising
storing the compression information in the additional data area together with the error correcting code having a number of bits that enables one-bit error correction and two-bit error detection corresponding to a number of bits of the compressed data.

3. The memory control method according to claim 1, further comprising
storing the error correcting code in the additional data area, the additional data area having a larger number of bits than a number of bits of the error correcting code that enables one-bit error correction and two-bit error detection corresponding to a number of bits of the compressed data, and storing the compression information in an unused area of the additional data area.

4. The memory control method according to claim 1, wherein
when the readout process is performed by burst transfer of data of a predetermined capacity the determined number of times.

5. The memory control method according to claim 1, further comprising
storing, in the additional data area having 16 bits, the error correcting code having 9 bits corresponding to the compressed data having 128 bits, and the compression information having 7 bits at most.

6. A memory control device comprising:
at least one memory configured to store instructions; and
at least one processor configured to execute instructions to:
store additional data in an additional data area of memory-stored data of a memory including compressed data, the additional data including an error correcting code of the compressed data and compression information representing a degree of compression of the compressed data; and
when reading out the memory-stored data from the memory, perform a readout process a number of times based on the degree of compression represented by the compression information in the additional data area, wherein
the number of times that the readout process is performed is determined when reading out the memory-stored data from the memory on a basis of a data capacity before compression, a read capacity of one readout process, and the degree of compression represented by the compression information in the additional data area.

7. The memory control device according to claim 6, wherein the at least one processor is configured to execute the instructions to:
store the compression information in the additional data area together with the error correcting code having a number of bits that enables one-bit error correction and two-bit error detection corresponding to a number of bits of the compressed data.

8. The memory control device according to claim 6, wherein the at least one processor is configured to execute the instructions to:
store the error correcting code in the additional data area, the additional data area having a larger number of bits than a number of bits of the error correcting code that enables one-bit error correction and two-bit error detection corresponding to a number of bits of the compressed data, and store the compression information in an unused area of the additional data area.

9. The memory control device according to claim 6, wherein
when the readout process is performed by burst transfer of data of a predetermined capacity the determined number of times.

10. The memory control device according to claim 6, wherein the at least one processor is configured to execute the instructions to:
store, in the additional data area having 16 bits, the error correcting code having 9 bits corresponding to the compressed data having 128 bits, and the compression information having 7 bits at most.

11. A non-transitory computer-readable medium storing thereon a program comprising instructions for causing a memory control device to:
store additional data in an additional data area of memory-stored data of a memory including compressed data, the additional data including an error correcting code of the compressed data and compression information representing a degree of compression of the compressed data; and
when reading out the memory-stored data from the memory, perform a readout process a number of times based on the degree of compression represented by the compression information in the additional data area, wherein
the number of times that the readout process is performed is determined when reading out the memory-stored data from the memory on a basis of a data capacity before compression, a read capacity of one readout process, and the degree of compression represented by the compression information in the additional data area.

\* \* \* \* \*